US006736383B2

(12) United States Patent
Kohlert

(10) Patent No.: US 6,736,383 B2
(45) Date of Patent: May 18, 2004

(54) CLAMPING ELEMENT WITH SLIDING CLAMPING CLAW

(75) Inventor: Rudolf Kohlert, Stockstadt (DE)

(73) Assignee: A Römheld GmbH & Co. KG, Laubach (DE)

( * ) Notice: Subject to any disclaimer, the term of this patent is extended or adjusted under 35 U.S.C. 154(b) by 0 days.

(21) Appl. No.: 10/286,567

(22) Filed: Nov. 1, 2002

(65) Prior Publication Data

US 2003/0085500 A1 May 8, 2003

(30) Foreign Application Priority Data

Nov. 3, 2001 (DE) ........................................ 101 54 139

(51) Int. Cl.[7] .................................................. B23G 3/08

(52) U.S. Cl. ............................ 269/32; 269/94; 269/99; 269/234; 269/238

(58) Field of Search ............................ 269/32, 99, 94, 269/234, 238, 232, 229, 138, 91, 92, 93, 100

(56) References Cited

U.S. PATENT DOCUMENTS

| | | | | | |
|---|---|---|---|---|---|
| 4,451,026 A | * | 5/1984 | Coope | | 269/24 |
| 4,538,797 A | * | 9/1985 | Lerch | | 269/27 |
| 4,590,788 A | * | 5/1986 | Wallis | | 72/482.2 |
| 4,932,640 A | * | 6/1990 | Shirakawa | | 269/32 |
| 5,002,265 A | * | 3/1991 | Burt et al. | | 269/93 |
| 5,921,533 A | * | 7/1999 | Miyamoto et al. | | 269/71 |
| 6,371,467 B1 | * | 4/2002 | Nishimoto et al. | | 269/32 |

OTHER PUBLICATIONS

Otto Ehrenfeld, 1992, *Devices, Efficient Planning and Design*, VDI–Verlag, p. 489.

* cited by examiner

*Primary Examiner*—Joseph J. Hail, III
*Assistant Examiner*—Daniel Shanley
(74) *Attorney, Agent, or Firm*—McGlew and Tuttle, P.C.

(57) ABSTRACT

A clamping element is provided for clamping work pieces on machine tables and the like with a tiltably mounted clamping lever, which is longitudinally displaceable in the clamping plane. The clamping element includes a housing (1) provided with a fork head (3), in the forks of which holes (4) are provided centrally and into which a king pin (5) each is inserted in a rotatably mounted manner. The king pins (5) are provided with guide pins (6), which have two opposite flattened areas. The clamping lever is a square with two grooves (8) milled in, in opposite locations. The clamping lever (2) can be pushed with its grooves (8) onto the guide pins (6) of the king pins (5) inserted into the fork head (3).

12 Claims, 2 Drawing Sheets

CLAMPING ELEMENT WITH SLIDING CLAMPING CLAW

FIELD OF THE INVENTION

The present invention pertains to a clamping element for clamping workpieces on machine tables, devices or pallets by means of a tiltably mounted clamping lever, which is displaceable in a clamping plane.

BACKGROUND OF THE INVENTION

The clamping of workpieces on machine tables and the like requires clamping elements that have a large free space in order to change the workpiece without having to remove the clamping lever. In addition, the clamping levers must be able to be adapted to the particular workpiece inserted. This is achieved, on the one hand, by changing the clamping levers that are available in different sizes, and, on the other hand, by means of clamping levers that are mounted such that they can be adapted in their length to the workpiece.

The forces that are generated by the machining of the workpieces may be very strong and must be reliably absorbed by the clamping levers and their bearings. Changes in the cross section on the clamping levers due to the introduction of longitudinal slots for the longitudinal displacement have an adverse effect on the transmission of forces. Moreover, longitudinal slots are subject to risks of contamination due to flying chips.

It has been known (VDI-Verlag, 1992, p. 489, Devices, Efficient Planning and Design) that a clamping element can be provided with a clamping lever that is held by a screw. This screw is provided with a conical socket, which is mounted in a spherical disk. The clamping lever is provided with a longitudinal slot, by which the screw is guided. This longitudinal slot leads to a substantial weakening of the cross section of the clamping lever; in addition, the center of gravity for the clamping lever is located too high due to the spherical disk lying on the clamping lever and the conical socket of the screw, so that force components acting obliquely on the workpiece cannot be ruled out, which may lead to tearing of the workpiece. The longitudinal slot is, furthermore, exposed to contamination by chips during machining, which contributes to difficulties in the return of the clamping lever.

Such an arrangement is also associated with problems if the clamping lever is provided with a pressing screw for adaptation to different workpiece heights. To remove such a clamping lever from the range of action of the workpiece, the center of gravity must be located far away from the workpiece, as a result of which the clamping lever must be made very long, which has an unfavorable effect on the transmission of forces. The screw connection formed by the spherical disk and the conical socket is, moreover, elastic, so that the workpiece is supported insufficiently under the action of transverse forces as a consequence of machining.

SUMMARY OF THE INVENTION

The object of the present invention is to design a clamping element such that the clamping lever has a pivotable design and is mounted displaceably in its longitudinal direction, but does not protrude from the clamping element in its starting position regardless of its length if a pressing screw is provided for adaptation to different workpiece heights.

According to the invention a clamping element for clamping workpieces on machine tables and the like is provided with a tiltably mounted clamping lever, which is arranged longitudinally displaceably in a clamping plane. A housing is provided with a fork head. In the forks of the fork head a hole is milled approximately centrally. A rotatably mounted king pin is inserted into each hole.

The advantage of this solution relates to an extremely stable mounting of the clamping lever. Transverse forces as a consequence of machining do not affect the clamping unit. In addition, the design permits small dimensions in the direction of the slide and consequently it makes it possible to eliminate disturbing edges for machining tools.

The king pin may have a guide pin provided with two flattened areas located opposite each other in the form of guide surfaces. The diameter of the guide pin may be smaller than, equal to or greater than the diameter of the king pin.

The clamping lever may have a square cross section with a guide grooves on opposite sides. The guide grooves may open at both ends of the clamping lever. The guide grooves may be milled on two opposite sides. The clamping lever can be fixed by means of a lock screw and its position can be defined by a pin.

The guide groove of the clamping lever and the guide surfaces of the guide pin may be coordinated with one another.

The fork head may be equipped with the king pins provided as two rotatably mounted king pins in holes. The guide pins of the king pins may protrude with guide surfaces into the space between the forks. The clamping lever can be inserted into the fork head and can be attached to the guide surfaces with its grooves and may be guided longitudinally displaceably and can be tilted around the central axis of the king pins.

The longitudinally displaceable and tiltable clamping lever can be brought hydraulically into its clamping position by means of a piston.

The clamping lever on the clamping head may be equipped with a pressing screw. The clamping lever may be introduced into the housing in a released state.

A pocket may be formed in the housing as a free space for the pressing screw fastened to the head of the clamping lever.

Sensors for monitoring the position of the clamping lever may be provided on the housing.

The present invention is described in greater detail in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
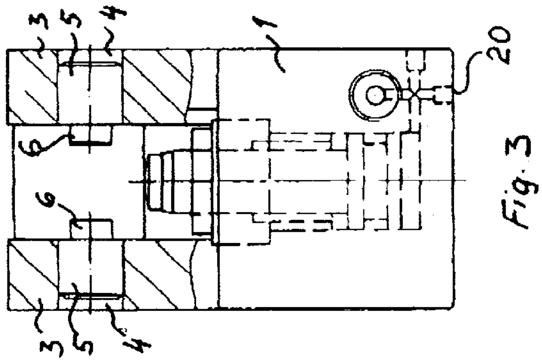
FIG. 3 is an end view of the clamping element with a partial section of the mounting point.
Figure 1:
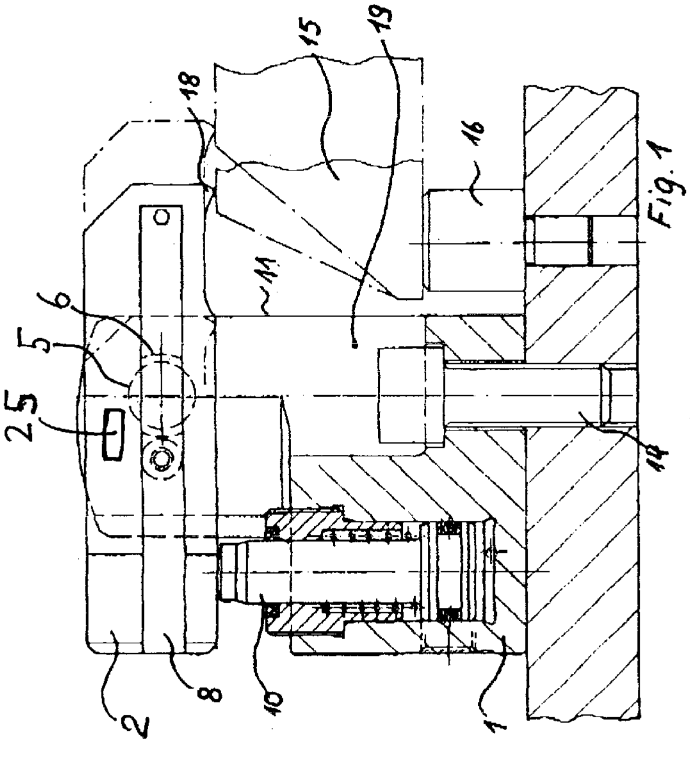
FIG. 1 is a front side partially sectional view through a clamping element in the clamped state.
Figure 2:
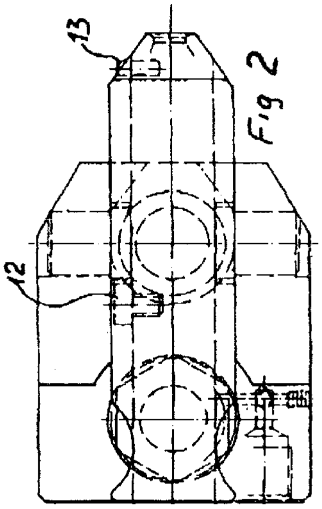
FIG. 2 is a top view of the clamping element.

Referring to the drawings in particular, the clamping element comprises a housing 1 as a basic body. The clamping lever 2 is associated with this housing 1. The clamping lever 2 is guided in a fork head 3 formed in the upper area of the housing 1. The fork head 3 is provided with a through hole 4. Two king pins 5 are inserted into these holes 4. Each king pin 5 has a guide pin 6 at one end. The guide pin 6 is flattened on two opposite sides and thus it forms a guide surface 7 on each side of the guide pin. The king pin 5 has a diameter that is adapted to the forces to be absorbed. The diameter of its guide pin 6 may differ therefrom. It is important for the flattened guide surfaces 7 to have a sufficient cross section and a sliding surface adapted to the circumstances. If the diameter (length) of the guide pin 6 is made larger than the diameter of the king pin 5, the advantage arises that a contact surface is also formed at the walls of the fork head 3. As such, the king pins 5 are guided in the holes 4 in a defined position.

In the cases in which the diameter of the guide pin 6 is equal to or smaller than the diameter of the king pin 5, the hole 4 is preferably closed with known means such that the free space of the king pin 5 is limited.

The clamping lever 2 has a square cross section and has a groove 8 each milled in on two opposite sides. This groove 8 exactly corresponds to the guide pin 6 with its flattened guide surfaces 7, so that the guide pins 6 can be introduced into the grooves 8 slidingly with their guide surfaces 7. The groove 8 is milled in the clamping lever 2 such that it is open toward the outside at both ends. The clamping lever 2 can be limited in its movement by means of a lock screw 12 such that it can be removed only after unscrewing the lock screw 12. A locking pin 13 is used to limit the return of the clamping lever.

The groove 8 milled into the clamping lever 2 in a continuous pattern is thus limited for the longitudinal movement of the clamping lever only by the pin 13. The position of this pin 13 is thus defined and is associated with the clamping lever 2 such that the clamping lever is always completely introduced into the housing 1 in the released state regardless of its length and regardless of its line-up on the clamping head 18 and thus it comes to lie behind the front surface 11.

The clamping lever 2 is introduced into the fork head 3 such that the grooves 8 run onto the guide surfaces 7 of the king pin 5. The clamping lever can thus be displaced in its longitudinal direction as desired and also pivoted by means of the central axis formed by the king pin 5. The length of the clamping lever 2 can thus be coordinated with the particular application. In addition, it is possible to provide clamping levers of different lengths, which can be changed very easily.

The clamping operation may be initiated hydraulically. A drive with piston 10 is provided for this purpose. The hydraulic supply may be preferably from below into the clamping element via the connection 20. This has a favorable effect on the installation of the elements.

The clamping lever 2 is fully introduced into the housing 1 in a released state. This ensures an optimal free space for the workpiece to be inserted because the housing 1 with its front surface 11 forms a smooth plane and this permits the effortless insertion and removal of each workpiece.

The clamping unit can be mounted on pallets or devices as desired and fixed by means of a fastening screw 14. A supporting element 16 may be additionally provided for mounting a workpiece 15.

Figure 4:
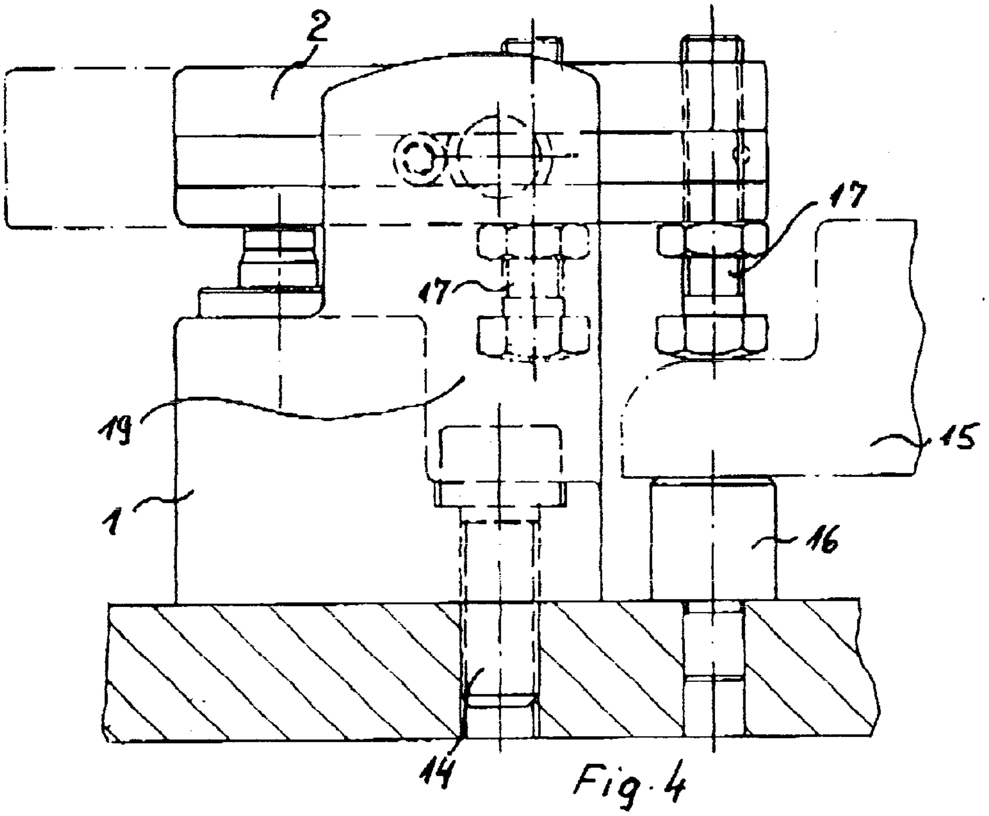
FIG. 4 is a front side view of the clamping element in the clamped state and the clamping levers with adjustable pressing screw.
Figure 5A:
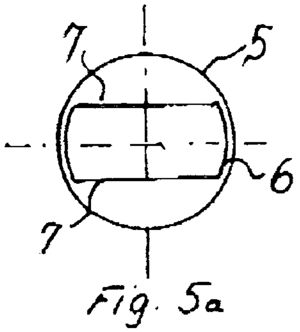
FIG. 5*a* is a king pin with a guide pin.
Figure 5B:
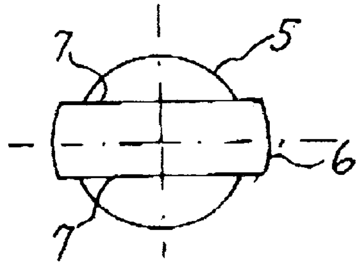
FIG. 5*b* is a king pin with a different guide pin.

FIG. 4 shows the clamping element with a pressing screw 17 arranged at the clamping head of the clamping lever 2. This pressing screw 17, which is adjustable in height, offers a good possibility of adaptation of the clamping element to different thicknesses of the workpiece 15. In the released state, the clamping lever 2 with the pressing screw 17 moves into the housing 1, so that the pressing screw 17 is accommodated in the pocket 19 formed in the housing 1, whose width approximately corresponds to the inside width of the fork head 3. The clamping lever 2 is thus pulled together with the pressing screw 17 into the housing 1 to the extent that it is located behind the front surface 11.

The clamping lever 2 is introduced with its bilateral groove 8 into the fork head 3 from the front and is pushed over the guide surfaces 7 of the already inserted king pin 5. The clamping lever is completely withdrawn now. The element is now ready for the clamping operation. The clamping lever 2 is entirely introduced into the housing 1 in this position, so that the front surface 11 of the housing 1 forms a smooth plane.

The clamping operation is initiated after the corresponding mounting and insertion of the workpiece. The clamping lever is fed to the extent that it is located with its clamping head 18 or its pressing screw 17 exactly above the point of the workpiece at which the clamping force shall be introduced. The hydraulic pressure is now released and the piston 10 moves under the clamping lever and raises same. The clamping lever tilts around the central axis of the king pin and lowers the clamping head 18 onto the workpiece. The clamping operation is thus complete.

It is necessary in certain cases to detect and display the position of the clamping lever 2 of each clamping element. This display pertains to the two end positions of the clamping lever, on the one hand, and also to the particular position during a work cycle, on the other hand. All the states that may also occur, among other things, as a consequence of strong machining forces, can thus be monitored. Sensors 25, which are placed on the housing and via which a path limitation of the clamping lever can be understood, are used to display the particular position.

While specific embodiments of the invention have been shown and described in detail to illustrate the application of the principles of the invention, it will be understood that the invention may be embodied otherwise without departing from such principles.

What is claimed is:

1. A clamping element for clamping workpieces on a machine table, the clamping element comprising:

a housing provided with a fork head having forks, each of said forks having a hole;

rotatably mounted king pins, each of said king pins including a guide pin provided with two flattened areas located opposite each other forming guide surfaces, each of said king pins being inserted in a respective one of said holes; and a clamping lever tiltably mounted via said king pins to said fork head and arranged longitudinally displaceably in a clamping plane.

2. A clamping element in accordance with claim 1, wherein a diameter of said guide pin is smaller than, equal to or greater than a diameter of said king pin.

3. A clamping element in accordance with claim 1, further comprising a lock screw and a pin, wherein said clamping lever has a square cross section and has guide grooves open at both ends of said clamping lever, said guide grooves being milled on two opposite sides and said clamping lever being fixed by means of said lock screw and a position of said clamping lever can be defined by said pin.

4. A clamping element in accordance with claim 3, wherein said guide groove of said clamping lever and said guide surfaces of said guide pin are coordinated with one another.

5. A clamping element in accordance with claim 1, further comprising guide pins, each of said guide pins being associated with a respective king pin, wherein said king pins are provided with said fork head, rotatably mounted in said holes and said guide pins of said king pins protrude to provide guide surfaces extending into a space between said forks, said clamping lever having guide grooves open at both ends of said clamping lever, said guide grooves being milled on two opposite sides of said clamping lever, and said clamping lever being inserted into said fork head and being attached to said guide surfaces by engagement of surfaces of said grooves, said clamping lever being guided longitudinally displaceably and being tilted around a central axis of said king pins.

6. A clamping element in accordance with claim 5, further comprising a piston, wherein said longitudinally displaceable and tiltable clamping lever can be brought hydraulically into a clamping position by movement of said piston.

7. A clamping element in accordance with claim 1, further comprising a pressing screw, wherein said clamping lever on said clamping head is equipped with said pressing screw.

8. A clamping element in accordance with claim 1, wherein said clamping lever can be introduced into said housing in a released state.

9. A clamping element in accordance with claim 7, wherein a pocket is formed in said housing as a free space for said pressing screw fastened to a head of said clamping lever.

10. A clamping element in accordance with claim 1, further comprising sensors for monitoring a position of said clamping lever, said sensors being provided on said housing.

11. A clamping element in accordance with claim 1, wherein each of said holes is milled in said forks of said housing approximately centrally.

12. A clamping element, comprising:

a housing provided with a fork head having a first fork with a first fork bore and a second fork with a second fork bore;

a first king pin rotatably mounted in said first fork bore;

a second king pin rotatably mounted in said second fork bore;

a first guide pin connected to said first king pin, said first guide pin having a first guide pin guide surface;

a second guide pin connected to said second king pin, said second guide pin having a second guide pin guide surface;

a clamping lever with a first groove receiving said first guide pin guide surface and a second groove receiving said second guide pin guide surface to tiltably and longitudinally displaceably mount said clamping lever to said housing.

* * * * *